(12) United States Patent
Cavanna et al.

(10) Patent No.: US 11,150,847 B2
(45) Date of Patent: *Oct. 19, 2021

(54) SHINGLED MAGNETIC RECORDING DRIVE MAPPING USING NONVOLATILE RANDOM ACCESS MEMORY FOR PERSISTENT UPDATES

(71) Applicant: International Business Machines Corporation, Armonk, NY (US)

(72) Inventors: Carlos D. Cavanna, Toronto (CA); Ann Corrao, Raleigh, NC (US); Robert Francis, Ontario (CA); Ronen Grosman, Ontario (CA); Hamdi Roumani, Ontario (CA); Ao Wan, Ontario (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 184 days.

This patent is subject to a terminal disclaimer.

(21) Appl. No.: 16/515,152

(22) Filed: Jul. 18, 2019

(65) Prior Publication Data

US 2019/0339913 A1 Nov. 7, 2019

Related U.S. Application Data

(63) Continuation of application No. 15/837,073, filed on Dec. 11, 2017, now Pat. No. 10,423,365, which is a continuation of application No. 15/807,943, filed on Nov. 9, 2017, now Pat. No. 10,423,364.

(51) Int. Cl.
*G06F 12/00* (2006.01)
*G06F 3/06* (2006.01)
*G06F 16/13* (2019.01)
*G11B 5/012* (2006.01)

(52) U.S. Cl.
CPC ........... *G06F 3/0688* (2013.01); *G06F 3/065* (2013.01); *G06F 3/0619* (2013.01); *G06F 3/0685* (2013.01); *G06F 16/13* (2019.01); *G11B 5/012* (2013.01)

(58) Field of Classification Search
None
See application file for complete search history.

(56) References Cited

U.S. PATENT DOCUMENTS 10,423,364 B2* 9/2019 Cavanna ............... G06F 3/0688
2017/0277438 A1* 9/2017 Gole .................... G06F 3/0676

OTHER PUBLICATIONS

List of all IBM related dockets. Appendix P. 2019.
List of all IBM related dockets, 2021.

* cited by examiner

*Primary Examiner* — Daniel D Tsui
(74) *Attorney, Agent, or Firm* — Garg Law Firm, PLLC; Rakesh Garg; Aaron Pontikos

(57) ABSTRACT

A request for changing data of a file system data structure stored on a shingled magnetic recording (SMR) drive is received. The data change is logged in a log entry of a log structure stored in a non-volatile random access memory (NVRAM). The log entry is added as a new entry at an end of the log structure. The log entry is marked within the NVRAM as modified and a predetermined criterion is determined to be satisfied. Responsive to determining that the predetermined criterion is satisfied, the NVRAM is searched for log entries marked as modified. The modified log entries are stored to the SMR drive.

18 Claims, 17 Drawing Sheets

SHINGLED MAGNETIC RECORDING DRIVE MAPPING USING NONVOLATILE RANDOM ACCESS MEMORY FOR PERSISTENT UPDATES

TECHNICAL FIELD

The present invention relates generally to a method, system, and computer program product for recording drive mapping using non-volatile memory. More particularly, the present invention relates to a method, system, and computer program product for shingled magnetic recording (SMR) drive mapping using non-volatile random access memory (NVRAM) for persistent updates.

BACKGROUND

Shingled magnetic recording (SMR) is a hard disk drive recording technology designed to increase density beyond the limits of traditional hard disk recording technology such as perpendicular magnetic recording (PMR). With PMR technology, data is recorded on the hard drive surface using non-overlapping magnetic tracks that are arranged parallel to one another. With SMR technology, a new magnetic track is recorded that partially overlaps a previously recorded magnetic track, leaving the previous track narrower and allowing for higher track density. Accordingly, the tracks partially overlap one another in a manner analogous to overlapping roof shingles. Since current magnetic readings heads have a width that is physically narrower than that of current magnetic writing heads, the reading of non-overlapping portions of previously written tracks is possible despite the partial overlapping of the tracks. Accordingly, storage density can be increased upon the hard disk surface.

SUMMARY

The illustrative embodiments provide a method, system, and computer program product. An embodiment of a method includes receiving a request for changing data of a file system data structure stored on a shingled magnetic recording (SMR) drive, and logging the data change in a log entry of a log structure stored in a non-volatile random access memory (NVRAM). The log entry is added as a new entry at an end of the log structure. The method further includes marking the log entry within the NVRAM as modified, and determining that a predetermined criterion is satisfied. The method further includes, responsive to determining that the predetermined criterion is satisfied, searching the NVRAM for log entries marked as modified. The method still further includes storing the modified log entries to the SMR drive.

An embodiment further includes maintaining a copy of the file system data structure in a random access memory (RAM), and making the requested data change to the RAM responsive to the logging of the data change in the log entry of the log structure.

An embodiment further includes setting a data consistency flag associated with the new entry to a first value responsive to logging the data change in the log entry of the log structure. Another embodiment further includes setting the data consistency flag associated with the entry to a second value responsive to the receiving of the data change request.

Another embodiment further includes storing a first checkpoint mark on the SMR drive responsive to the storing of the modified entries to the SMR drive. Another embodiment further includes cleaning the log structure within the NVRAM responsive to the storing of the checkpoint mark on the SMR drive. Another embodiment still further includes storing a second checkpoint mark in the NVRAM.

In an embodiment, the predetermined criterion includes at least one of detecting disk inactivity, determining that the log structure is full in the NVRAM, and determining that a threshold number of data changes has been performed. In an embodiment, the log structure includes a fixed size array. In another embodiment, a location of the new entry within the log structure is determined using a counter stored in the NVRAM. In another embodiment, the log entry includes a pointer associating the data change with an entry in the file structure table stored in the NVRAM.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
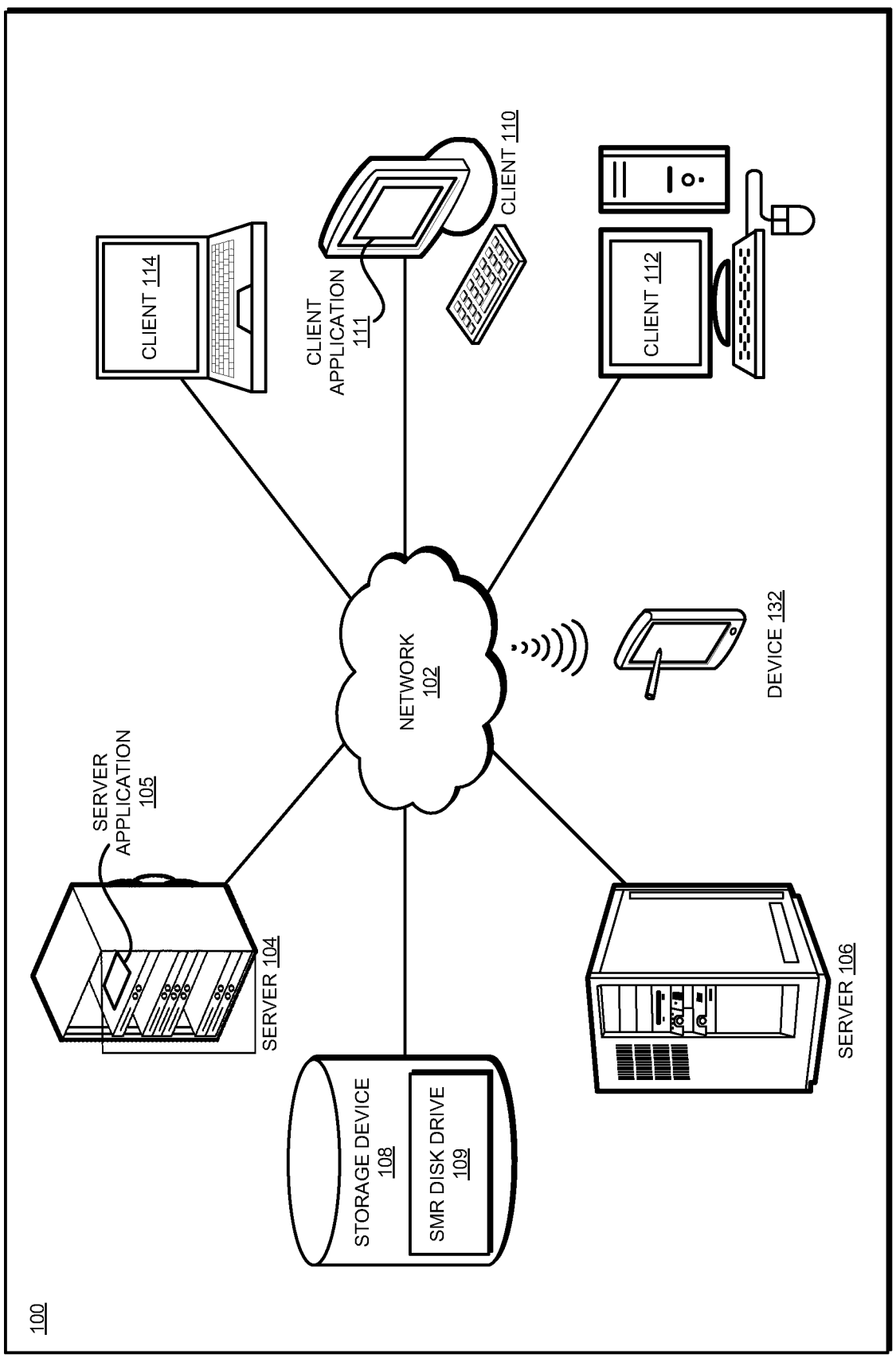
FIG. 1 depicts a block diagram of a network of data processing systems in which illustrative embodiments may be implemented.

Various illustrative embodiments provide for shingled magnetic recording (SMR) drive mapping using non-volatile random access memory (NVRAM) for persistent updates. SMR hard drive technology is based on physically overlapping portions of the tracks in which data is stored on the media of the hard drive. Within each hard drive, these tracks are grouped into independent zones having a separation gap between each zone. A benefit of SMR technology is that it increases the data density in the media. However, a potential drawback of SMR technology is that it requires a system to perform sequential writes on each of the data zones when storing data. When data is stored in a random location within a zone, all following sectors and tracks after that point may need to be rewritten. The practical implication is that in order to allow the hard disk to operate as optimally as possible, it is necessary to rearrange all the write operations on the disk so that they are written in as a sequential manner as possible.

In order to be able to reference files on a hard drive, it is necessary to maintain data structures that allow an operating system to physically locate the files when requested by the user and/or client programs. When a change is made to a file, the operating system is aware of the file system structure and makes changes to the file accordingly. Typically, these data structures reside on the hard drive, with parts being cached in main memory in the form of RAM. However, with an SMR drive, it is often not possible to distribute file system data structures evenly on the disk. Changes to data in any entry may require rewriting an entire zone. SMR drives have a conventional zone area, usually at the beginning of the disk, where it's possible to perform direct operations. Accordingly, all the file system data can be stored in these conventional zones. However, doing so may increase latency for some operations on the disk because of the additional seek time required to move the write head from the conventional zone to the current writing zone.

Various embodiments describe herein provide for a mechanism for maintaining file system data structures for an SMR drive optimally using NVRAM for safely and efficiently recording file system changes. NVRAM is RAM memory that retains stored information when power to the NVRAM is disconnected. This is in contrast to dynamic random access memory (DRAM) and static random access memory (SRAM) which both maintain stored data only for as long as power is applied.

One or more embodiments address a problem of how to efficiently maintain references to files in an SMR drive using NVRAM. Keeping file system information in memory makes file system updates very efficient. However, maintaining the file system information in memory also makes the file system information vulnerable to system failures such as software failures or power failures. Various embodiments describe a fast and efficient mechanism to track file system activity on SMR drives as well as provide data safety and recoverability in case of power failures, hardware failures, software failures, and other failures.

In an embodiment, NVRAM-based logging is utilized for implementing faster updates of file changes and checkpoints are used for facilitating recovery of data in the event of a failure as further described herein. In the embodiment, RAM memory maintains a copy of the file system data structures of the SMR disk. The file system data structure reference all of the elements that constitute the files stored on the disk. In cases in which not all of the file system structures are able to fit in the RAM memory, only the most recently used are cached.

In the embodiment, whenever a file changes that requires a change to the data structure, the change is first logged in NVRAM. In a particular embodiment, a new record is added at the end of a log structure stored in NVRAM. In one or more embodiments, the log structure is an array of fixed size and the next entry to use is determined using atomic update operations on a counter also stored in NVRAM to allow records to be added in order. In an atomic update operation, a data value may only have two states and reading the data value will always return one of the two states with nothing in between. In the embodiment, the use of locks by the operating system is avoided. When a lock is used, a particular program or process takes control of a file system operation on data while preventing any other program or process from accessing the data until the lock is released. The use of locks is avoided if possible because locks may be computationally expensive.

In particular embodiments, each entry may consume several bytes of memory and therefore an extra precaution should be taken in case there is a failure while the data is being stored. In the embodiment, each log entry contains a flag that marks when the entire record was set. In the embodiment, the flag is stored at the last byte to be set for each entry. When the flag is set, the system can be assured that the entire log entry was recorded in NVRAM. In a particular embodiment, when data is in the process of being set on a record entry, a data consistency flag is set to False, and when all the data is set for all of the entries, the data consistency flag is set to True.

In the embodiment, each record entry contains the details indicating the changes to be made in the file system data structure. In a particular embodiment, the file system data structure changes are logged in such a manner that it is possible to "replay" the changes later if necessary, such as during a recovery operation after a failure. In such instances, applying the changes more than once does not affect the end result of the data stored in the data structures after all the changes have been applied, so any value must be an absolute value, and operations cannot be logged in a way that the operations perform operations relative to memory contents or other values. Accordingly, the operations exhibit idempotence, meaning that the same operation can be performed repeatedly while still producing the same result.

In the embodiment, after the requested change is added to the log structure, the actual change is performed in the data structure stored in RAM. After the change is completed in RAM, the records changed in RAM are marked as "dirty". In a particular embodiment, the log in NVRAM contains a reference to the entry that is being modified.

When a predetermined criterion is satisfied, such as when disk inactivity is detected, the log is full in NVRAM or some other suitable criterion, a background process searches the log for modified entries in NVRAM and stores all of the modified entries to the SMR disk. After all of the modified entries are stored to disk, a checkpoint mark is also stored on the disk as indication of the last piece of data stored. After the checkpoint mark is stored, the log structure in NVRAM is cleaned and a new checkpoint mark is associated with the log in NVRAM to enable further tracking of changes to the file structure.

In one or more embodiments, if there is a system failure, the system checks for the latest checkmark point that is stored on the SMR disk, and then checks for the checkmark point stored in NVRAM. If NVRAM contains the same checkmark point as the SMR disk, then the system determines that all of the log entries in NVRAM have already been applied and materialized on the SMR disk before the failure occurred.

If NVRAM contains a more recent checkmark point, then the system loads the data from disk, replays all the changes logged in the entries in NVRAM and saves the new data structures to disk. The system then continues to work normally.

An advantage of using NVRAM to store file system change information that may be provided by an embodiment includes allowing for fast updates to the file system data structures while keeping the file system structures consistent. The check point mechanism used for the data structures allows for consistency recovery in case of failure. Using NVRAM is much faster than immediately materializing all the changes to disk.

In another embodiment, NVRAM memory maintains a copy of the file system data structures. Whenever a file change is performed that require a change to the file system data structure, a new entry for the file structure is created and a reference to the change is updated directly in NVRAM, atomically. In the embodiment, the approach for making the changes to NVRAM is to allocate any file structure changes in a new memory entry and then atomically update a pointer associated with the change to the new entry in a file structure details table.

In an example operation, changes are to be made for a File n+1 having a current file structure details stored in a File Structure Details entry (m+1) within NVRAM. In the example, the changes are made and the updated information is stored in a new File Structure Details entry (m+3) and the File Structure Details entry (m+1) is discarded. After the change is performed, the records changed in NVRAM are marked as "dirty". In particular embodiments, the changed records are marked as "dirty" in the same data structure or in a separate structure in NVRAM that keeps track of what has been changed.

In the embodiment, when disk inactivity is detected or some other criterion such as reaching a threshold number of data changes is satisfied, a background process looks for all the dirty records in NVRAM memory and all the modified entries are stored to the SMR disk. As the modified entries are stored to the SMR disk, the dirty records are marked as clean.

If a reference to dirty records are stored with the same data structure, then it is necessary to use a synchronization mechanism, such as a lock, to avoid race conditions on the setting of this flag. However, if this reference is stored in an array of fixed size also in NVRAM, for example, noting what records were modified, the next entry to use can be determined using atomic update operations on a counter, thus avoiding the use of locks. In particular embodiments, the counter is also stored in NVRAM. In the embodiment, there is no need for the NVRAM-cached structure to have a checkpoint value. If the records are logged as dirty, the system knows that the records have not been saved to disk. When the records are no longer logged, the system knows that all the changes have been stored.

In another embodiment, atomic updates are stored in NVRAM using multiple structures to track file changes to avoid logging requirements for memory changes. The embodiment is similar to the previous embodiment except that a different mechanism is used to keep track of what entries need to be stored on the SMR disk drive. In the embodiment, a reference to dirty records is stored in an array of fixed size in NVRAM. Once that structure is full, a reference is passed to a process that stores all the entries in background. At that point, a new array is allocated to keep tracking further changes in memory, which in turn are passed to the background process for storing on the SMR disk. In the embodiment, entries within the array are determined using atomic update operations on a counter, thus avoiding the use of locks. In the embodiment, the counter is also stored in NVRAM. Using multiple structures also avoids the use of locks. In order to avoid allocating and reallocating memory, in particular embodiments, the array can be extended to use a pool of arrays. In the embodiment, there is no need for the NVRAM-cached structure to have a checkpoint value. If the records are logged in the array structure, the system knows that the records have not been saved to disk. When the records are no longer logged, the system knows that all the changes have been stored on the disk.

The illustrative embodiments are described with respect to certain types of storage devices, memory devices, services, transmissions, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
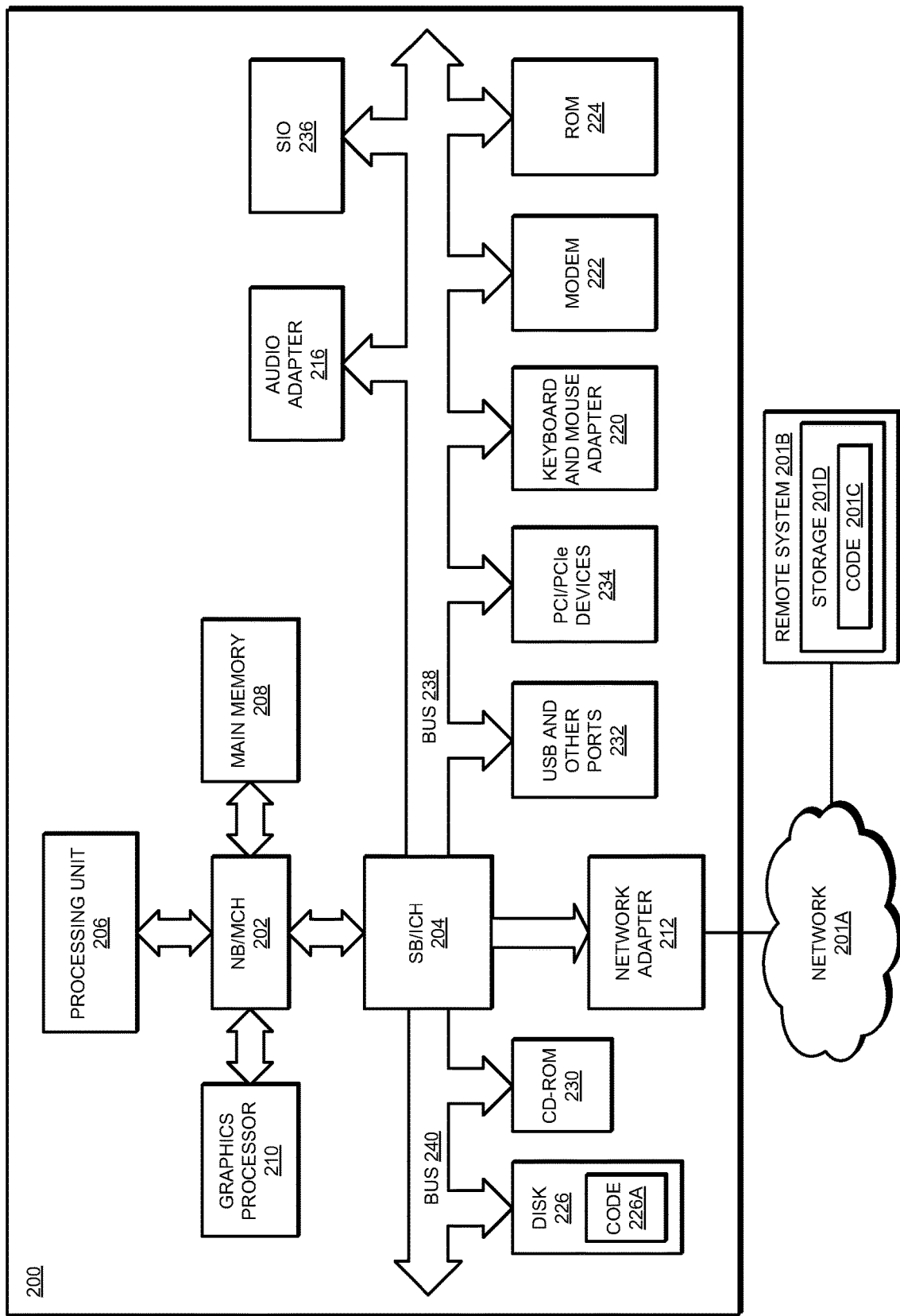
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage device 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Server application 105 of server 104 implements an embodiment of the operations for maintaining file system data structures for SMR disk drive 109 as described herein. SMR disk drive 109 may be contained in storage device 108 as shown or supplied by another source (not shown). In other embodiments, SMR disk drive 109 may be contained within server 104. In particular embodiments, SMR disk drive 109 stores files and file changes as described herein. Client application 111 implements an embodiment of the operations for maintaining file system data structures for SMR disk drive 109 as described herein.

Servers 104 and 106, storage device 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as device 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as server application 105 or client application 111 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
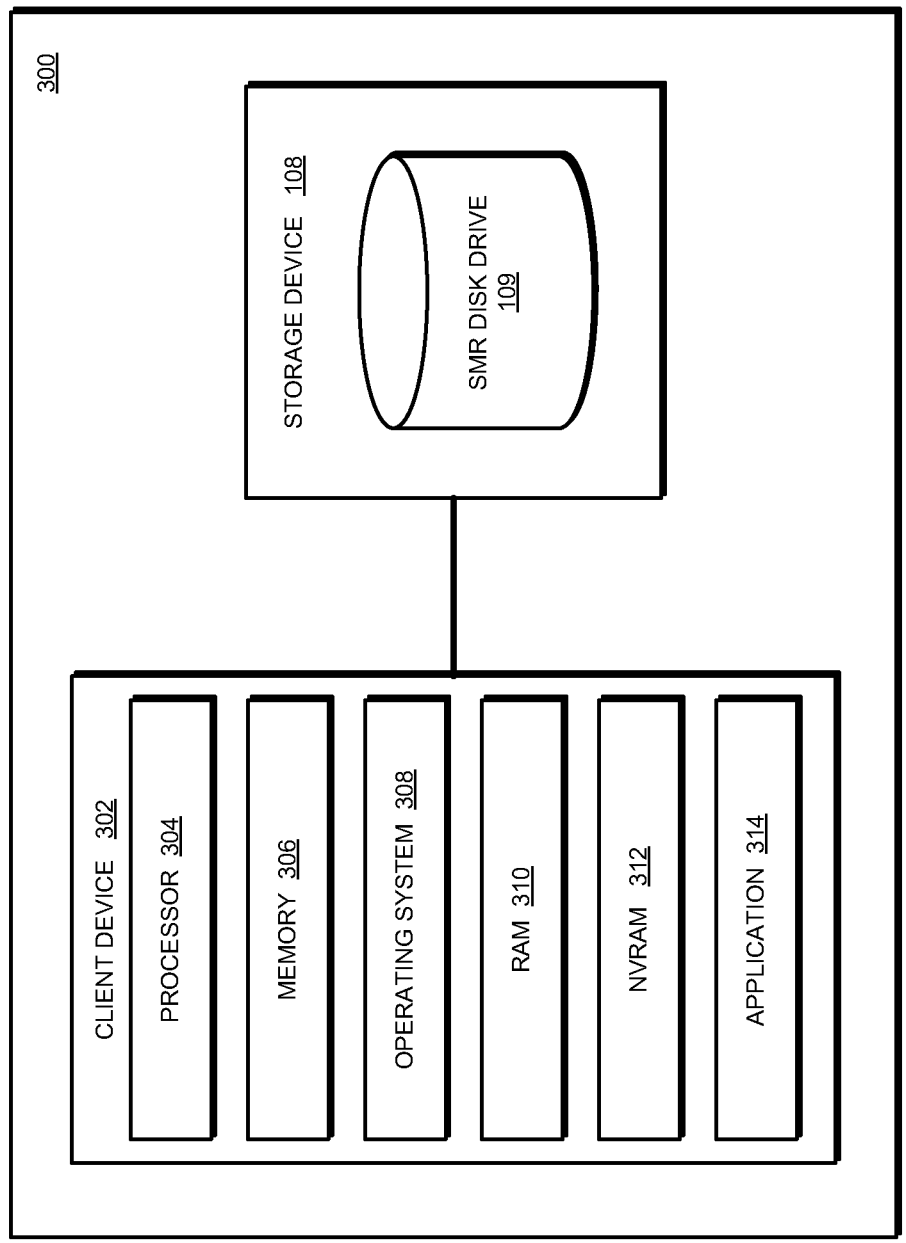
FIG. 3 depicts a block diagram of an example configuration for maintaining file system data structures for an SMR disk drive in accordance with an illustrative embodiment.

With reference to FIG. 3, this figure depicts a block diagram of an example configuration for maintaining file system data structures for an SMR disk drive in accordance with an illustrative embodiment. Client device 302 is an example of client 110 or server 104 in FIG. 1.

Client device 302 includes a processor 304, a memory 306, an operating system component 308, random access memory (RAM) 310, non-volatile RAM (NVRAM) 312, and application 314. Processor 304 is configured to execute software instructions stored in memory 306 to perform various operations of client 302 as described herein. Operating system component 308 is configured to read and store information to SMR disk drive 109 of storage device 108. RAM 310 is configured to store file structure and change information as described herein with respect to certain embodiments. NVRAM 312 is configured to store file structure and change information in a non-volatile manner as described herein with respect to various embodiments. Application 314 is configured to perform one or more of the operations for maintaining file system data structures for SMR disk drive 109 as described herein.

Figure 4A:
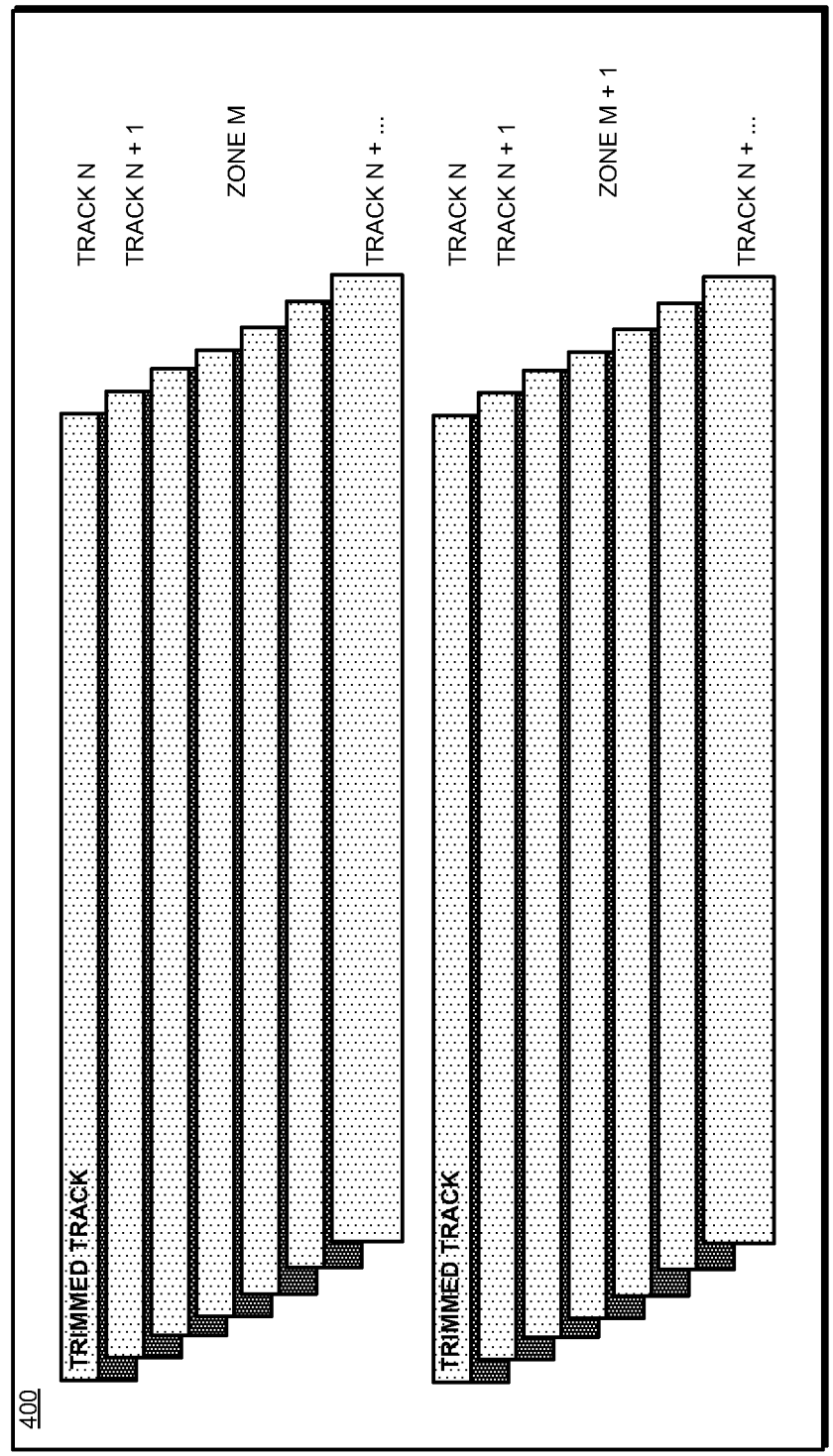
FIGS. 4A-4B depict example track structures for the SMR disk drive.

FIG. 4A depicts an example track structure 400 for SMR disk drive 109. Track structure 400 includes a first zone M including a number of partially overlapping tracks N to N+

Figure 4B:
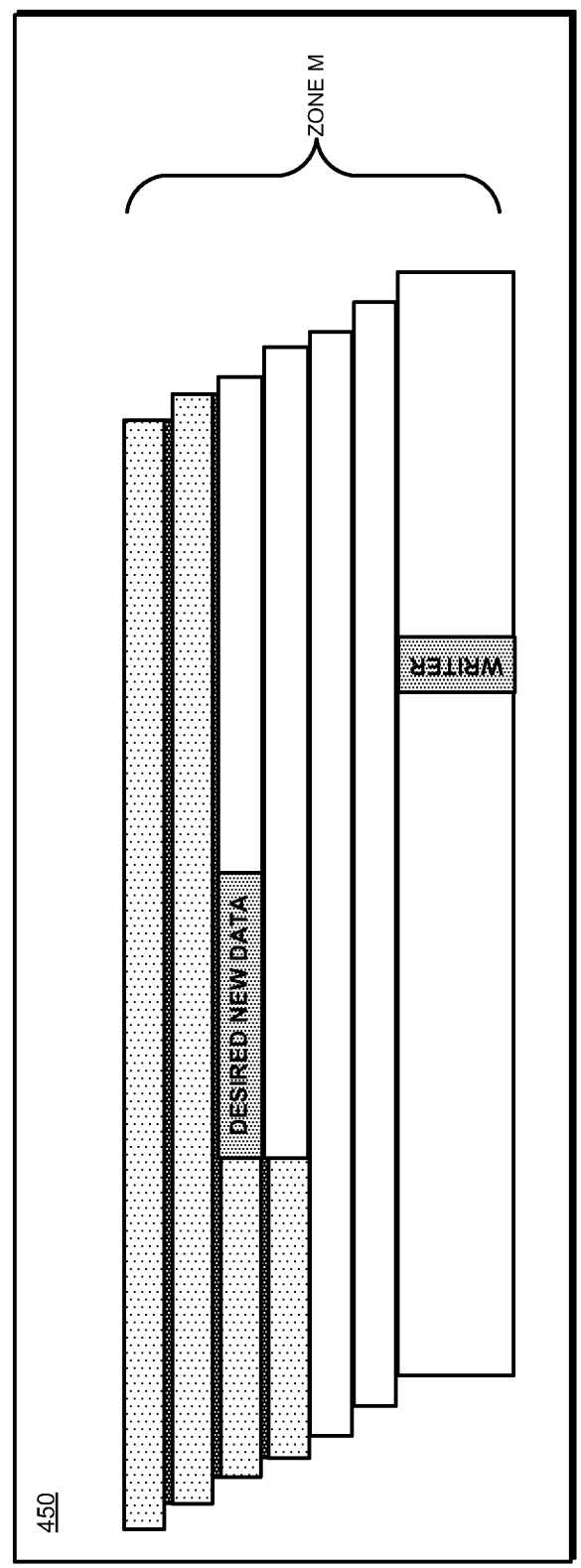

... and a second zone M+1 including a number of partially overlapping tracks N to N+ ... in which each of zone M and zone M+1 are independent of one another. As discussed above, a benefit of SMR technology is that it increases the data density in the media. However, the drawback is that it may require the system to perform sequential writes on each of the data zones. When data is stored in a random location within a zone, all following sectors and tracks after that point may need to be rewritten. As data is stored at a particular point in a particular track of a zone, all following tracks after that point within the zone may need to be rewritten. FIG. 4B depicts an example track structure 450 for SMR disk drive 109 in which desired new data is written within a particular track of zone M. All sectors of the tracks of zone M subsequent to the sectors of desired new data may also need to be rewritten to maintain data integrity.

Figure 5:
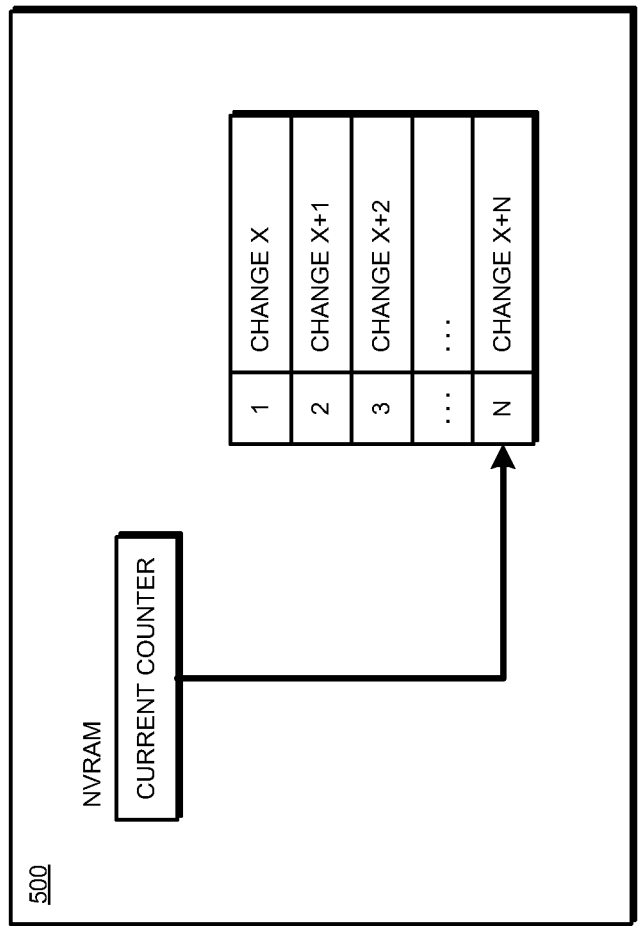
FIG. 5 depicts an embodiment of a log data structure stored within a NVRAM.

With reference to FIG. 5, this figure depicts an embodiment of a log data structure 500 stored within NVRAM 312 by application 314 for tracking file changes to be stored on SMR disk drive 109. Log data structure 500 includes a number of log entries 1-$n$ in which each log entry identifies a change to be made to the file system structure of SMR disk drive 109 resulting from a modification or other change to one or more files stored on SMR disk drive 109. In log data structure 500, each log entry 1-$n$ contains the details indicating the changes to be made in the file system data structure of SMR disk drive 109. For example, a first entry indicates a change X, a second entry indicates a change X+1, a third entry indicates a change X+2. A current counter indicates the most recent change in the log. In one or more embodiments, log data structure 500 is an array of fixed size. In a particular embodiment, the file system data structure changes are logged in such a manner that it is possible to "replay" the changes later if necessary, such as during a recovery operation after a failure.

In the embodiment, each log entry contains a data consistency flag that marks when the record was set. In the embodiment, the data consistency flag is stored by application 314 at the last byte to be set for each entry. Before setting of the data within the log entry, the data consistency flag for the entry is set to false. Setting the flag to false indicates that the data in the record is not consistent. After all of the data in the record is set, the flag is set to true and the system can be assured that the entire log entry was recorded in NVRAM.

Figure 6A:
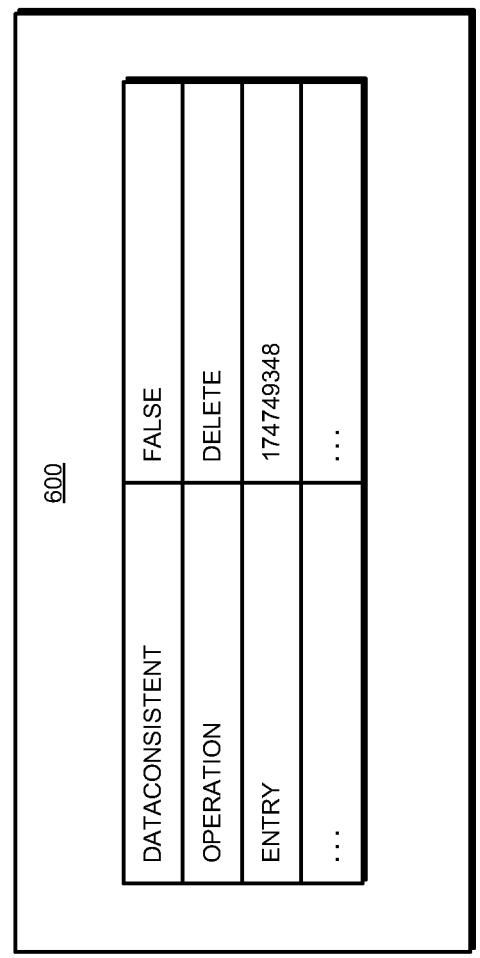
FIGS. 6A-6B depict example log entries stored within the NVRAM.
Figure 6B:
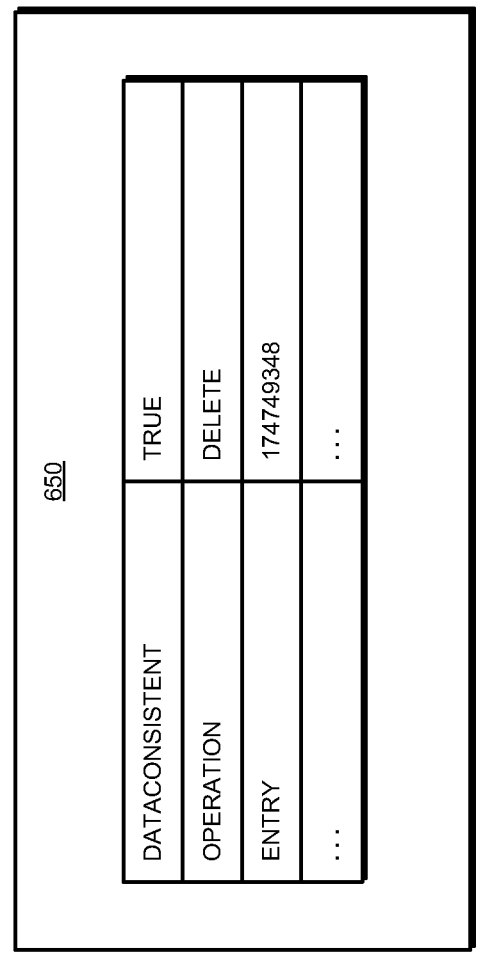

With reference to FIG. 6A, this figure depicts an example log entry 600 within NVRAM 312 that includes a data consistency flag DATACONSISTENT set to FALSE, an operation set to DELETE indicating a delete disk operation, and an entry value set to 174749348. When the data is set for a particular entry in NVRAM 312 by application 314, the data consistency flag is set to TRUE for the entry that is added or changed. With reference to FIG. 6B, this figure depicts an example log entry 600 within NVRAM 312 that includes the data consistency flag DATACONSISTENT set to TRUE indicating that the data has been set for all of the particular entry in NVRAM 312.

In the embodiment, after the requested change is added to the log structure in NVRAM 312, the actual change is performed in the file system data structure previously stored in RAM 310. After the change is completed in RAM 310, the records changed in RAM 310 are marked as "dirty".

When a predetermined criterion is satisfied, such as when disk inactivity is detected, the log is full in NVRAM or some other suitable criterion, a background process of application 314 searches for the modified records in NVRAM, and stores all of the modified entries to the SMR disk. After all of the modified entries are stored to disk, a checkpoint mark is also stored on the disk as indication of the last piece of data stored. After the checkpoint mark is stored, the log structure in NVRAM is cleaned and a new checkpoint mark is associated with the log in NVRAM to enable further tracking of changes to the file structure.

Figure 7A:
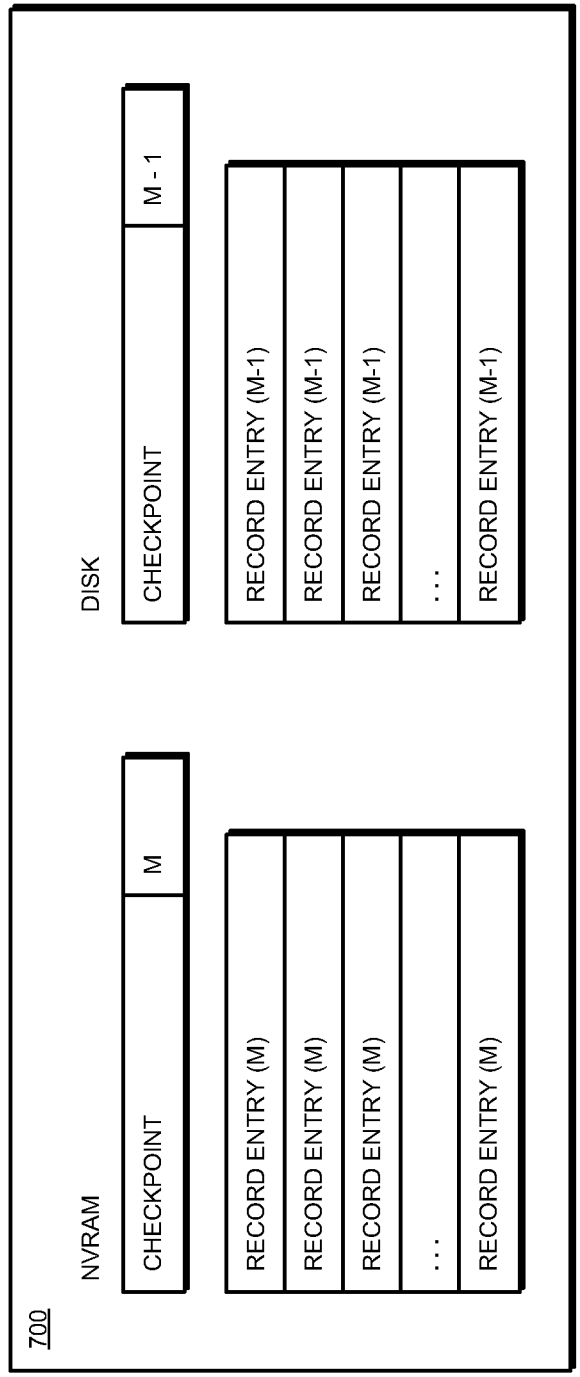
FIGS. 7A-7B depict an embodiment of a checkpoint structure stored by the NVRAM and the SMR disk drive.

With reference to FIG. 7A, this figure depicts an embodiment of a checkpoint structure 700 stored by NVRAM 312 and SMR disk drive 109 before entries of log structure 500 are stored on SMR disk drive 109. The checkpoint structure 700 includes a checkpoint M stored in NVRAM 312 in association with a number of record entries (M), and a checkpoint M−1 stored on SMR disk drive 109 in association with a number of record entries (M−1).

Figure 7B:
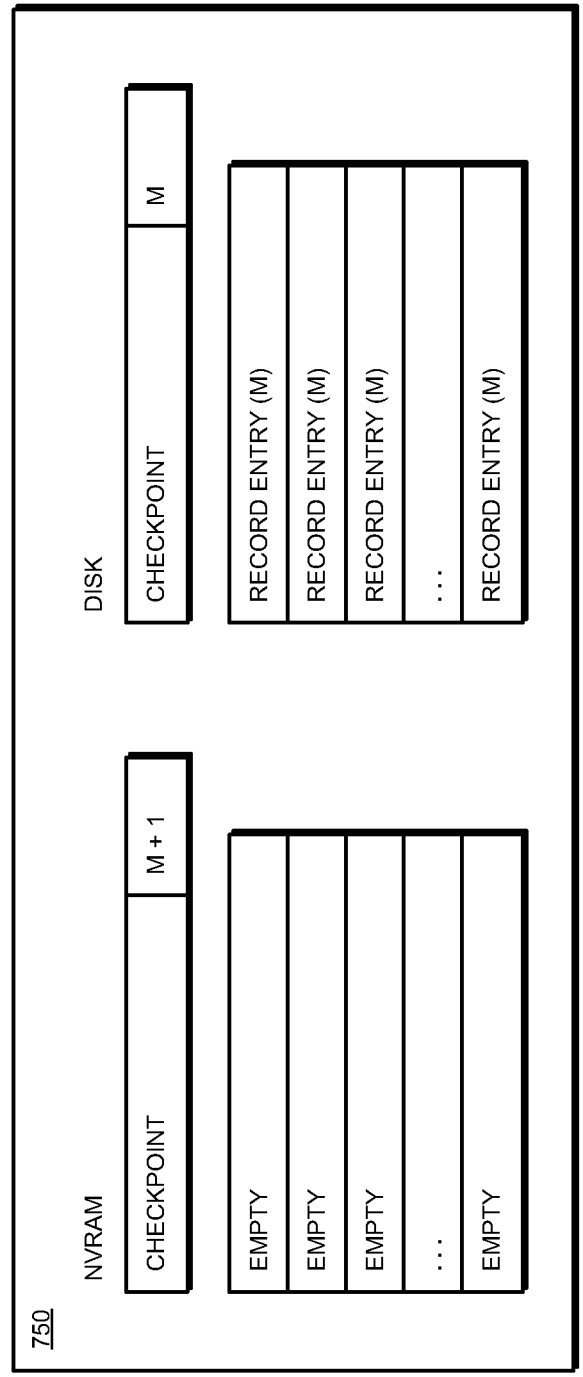

With reference to FIG. 7B, this figure depicts an embodiment of a checkpoint structure 750 stored by NVRAM 312 and SMR disk drive 109 after entries of log structure 500 are stored on SMR disk drive 109 for the checkpoint M. The checkpoint structure 750 includes a next checkpoint M+1 stored in NVRAM 312 in association with a number of empty records as a result of cleaning the log structure.

Figure 8:
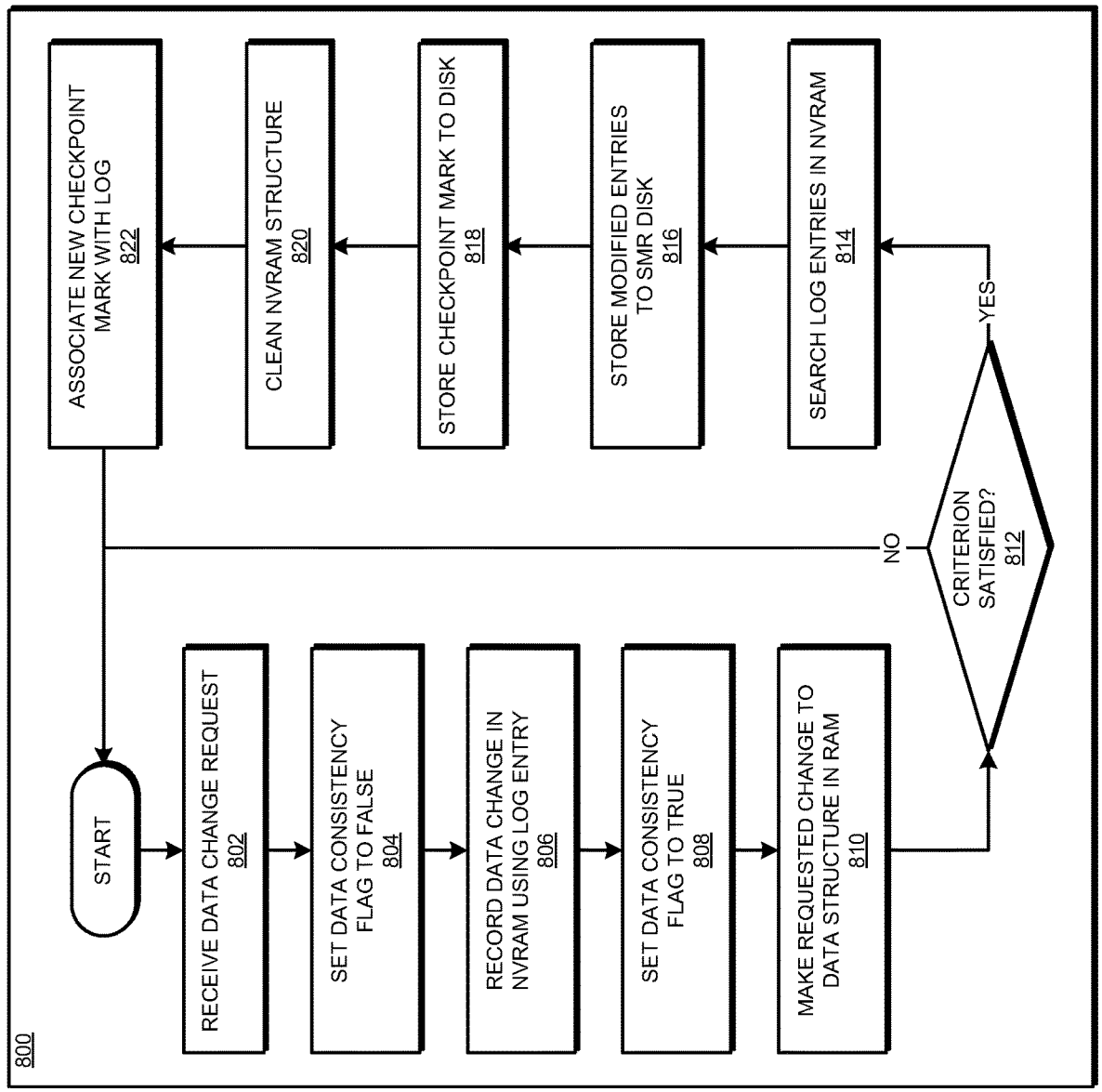
FIG. 8 depicts a flowchart of an example process for maintaining file system data structures for the SMR disk drive in accordance with an illustrative embodiment.

With reference to FIG. 8, this figure depicts a flowchart of an example process 800 for maintaining file system data structures for SMR disk drive 109 in accordance with an illustrative embodiment. In one or more embodiments, process 800 can be implemented in application 314 in FIG. 3. In still other embodiments, process 800 can be implemented in operating system 308 or a file system module in an operating system. In 802, application 314 receives a data change request for a file structure stored on SMR disk drive 109. In 804, application 314 sets a data consistency flag associated with a log entry corresponding to the requested data change to false. In 806, application 314 records the data change in NVRAM 312 using a log entry in a log data structure. In 808, application 314 sets the data consistency flag associated with the log entry to true. In 810, application 314 makes the requested data change to a copy of the file data structure stored in RAM 310. After the change is completed in RAM 310, application 314 considers the records in RAM 310 as "dirty", meaning the records are not yet stored to SMR disk drive 109.

In 812, application 314 determines whether a predetermined criterion is satisfied, such as when disk inactivity is detected, the log is full in NVRAM or some other suitable criterion. If the criterion is not satisfied the process 800 returns to 802. If the criterion is satisfied the process 800 proceeds to 814. In 814, a background process of application 314 searches NVRAM 312 for the modified log entries in NVRAM 312. In 816, application 314 stores the modified entries of NVRAM 312 to SMR disk drive 109. After all of the modified entries are stored to disk, in 818 application 314 stores a checkpoint mark in association on SMR disk drive 109 as an indication of the last piece of data stored. In 820, application 314 cleans the log structure in NVRAM 312. In 822, application 314 associates a new checkpoint mark with the log data structure in NVRAM 312 and process 800 returns to 802 to enable further tracking of changes to the file structure.

In one or more embodiments, if there is a system failure, application 314 checks for the latest checkmark point that is stored on SMR disk drive 109, and then checks for the checkmark point stored in NVRAM 312. If NVRAM 312 contains the same checkmark point as SMR disk drive 109, then the system determines that all of the log entries in NVRAM 312 have already been applied and materialized on SMR disk drive 109 before the failure occurred.

If NVRAM 312 contains a more recent checkmark point, then application 314 loads the data from SMR disk drive 109, replays all the changes logged in the entries in NVRAM 312 and saves the new data structures to SMR disk drive 109. The client 302 then resumes normal operations.

Figure 9A:
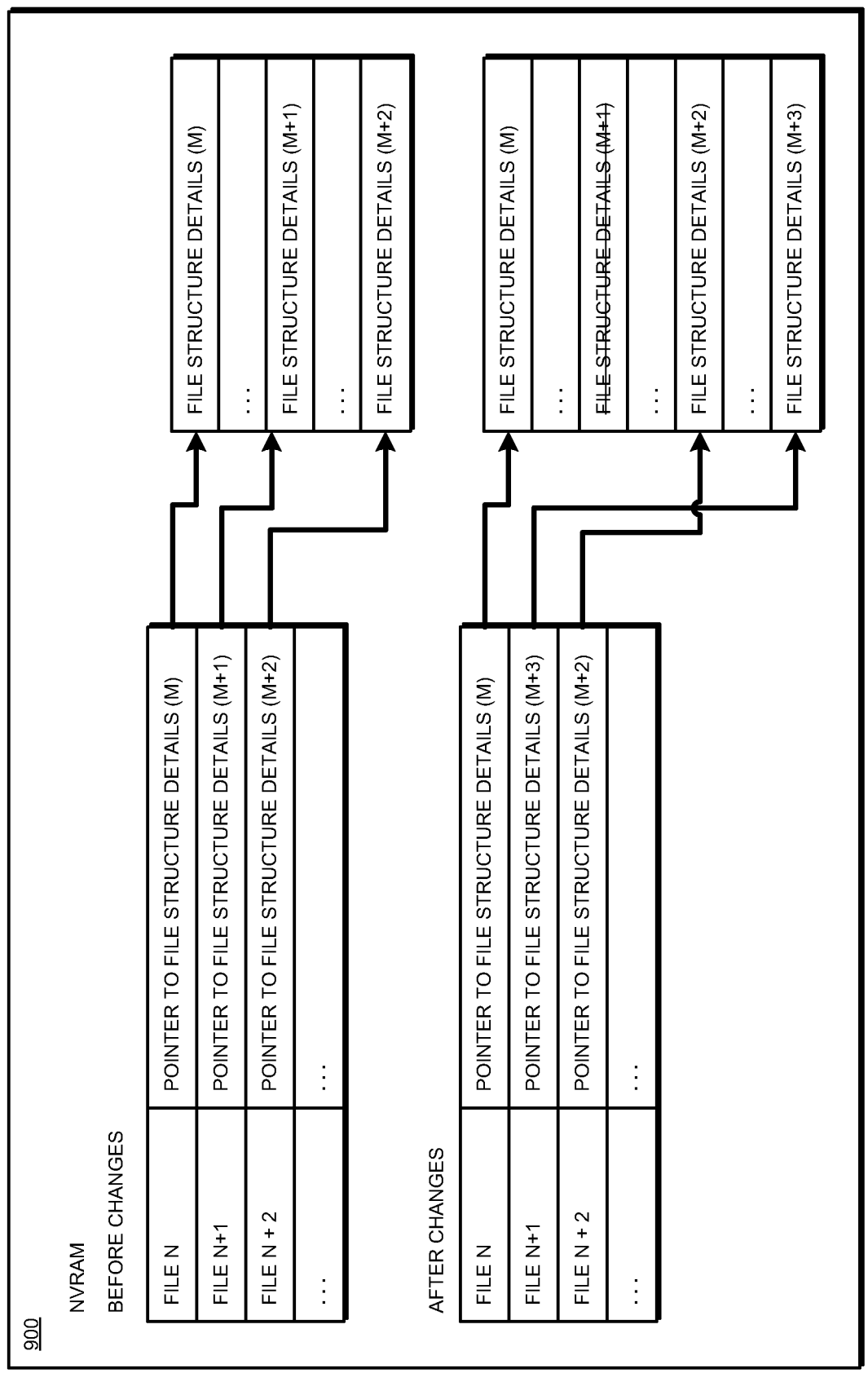
FIGS. 9A-9B depict an embodiment of a file system data structure stored within the NVRAM for tracking file changes to be stored on the SMR disk drive.

With reference to FIG. 9A, this figure depicts an embodiment of a file system data structure 900 stored within NVRAM 312 by application 314 for tracking file changes to be stored on SMR disk drive 109. File system data structure 900 includes a pointer table and a file structure details table both stored within NVRAM 312. An entry in the pointer table associates a particular file structure change with a pointer to an entry in the file structure details table. An entry in the file structure details contains a file structure associated with the particular file associated with the pointer.

In the particular example of FIG. 9A, the status of the pointer table and the file structure details table are shown before and after a change is performed. In the example of FIG. 9A, before a change is made File n is associated with a pointer to a File Structure Details entry (m), File n+1 is associated with a pointer to a File Structure Details entry (M+1), and File n+2 is associated with a pointer to a File Structure Details entry (M+2). In the example, a change is to be made to File n+1. A new entry File Structure Details (M+3) is created to be used for updated information and the pointer is updated to point to File Structure Details (M+3). The details stored in File Structure Details (M+1) are then discarded. After the change is performed, the records changed in NVRAM 312 are marked as "dirty" either in the same data structure or a separate data structure to keep track of changes. As shown in FIG. 9A, after changes are made the pointer associated with File n+1 now points to File Structure Details (m+3) and File Structure Details (m+1) are removed.

When disk inactivity is detected or some other criterion, such as reaching a certain number of changes, application 314 performs a background process to look for all the dirty records in NVRAM 312 and application 314 stores the modified entries to SMR disk drive 109. As this is being done, application 314 marks the dirty records as clean.

Figure 9B:
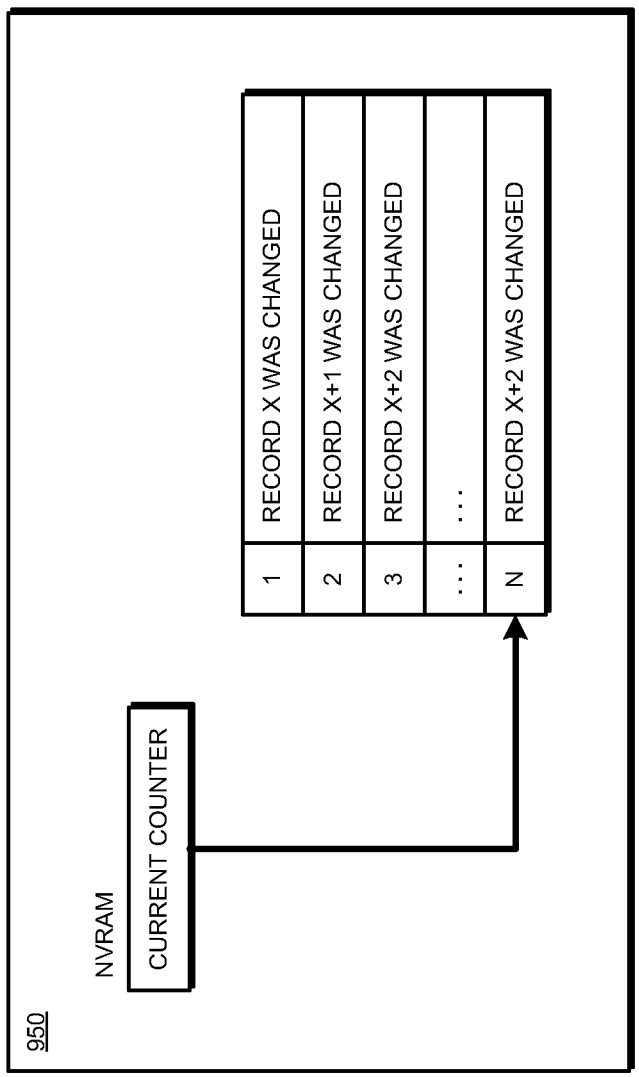

If a reference to dirty records are stored in a separate data structure, a counter stored in NVRAM 312 is used to facilitate tracking of changes. FIG. 9B illustrates a counter 950 for tracking a next changed entry associated with file system data structure 900 in which a current counter n is currently set at a record X+n. In an alternative embodiment, the reference to dirty records are stored in the same data structure. In such embodiments, a lock or locking mechanism may be used to prevent race conditions.

Figure 10:
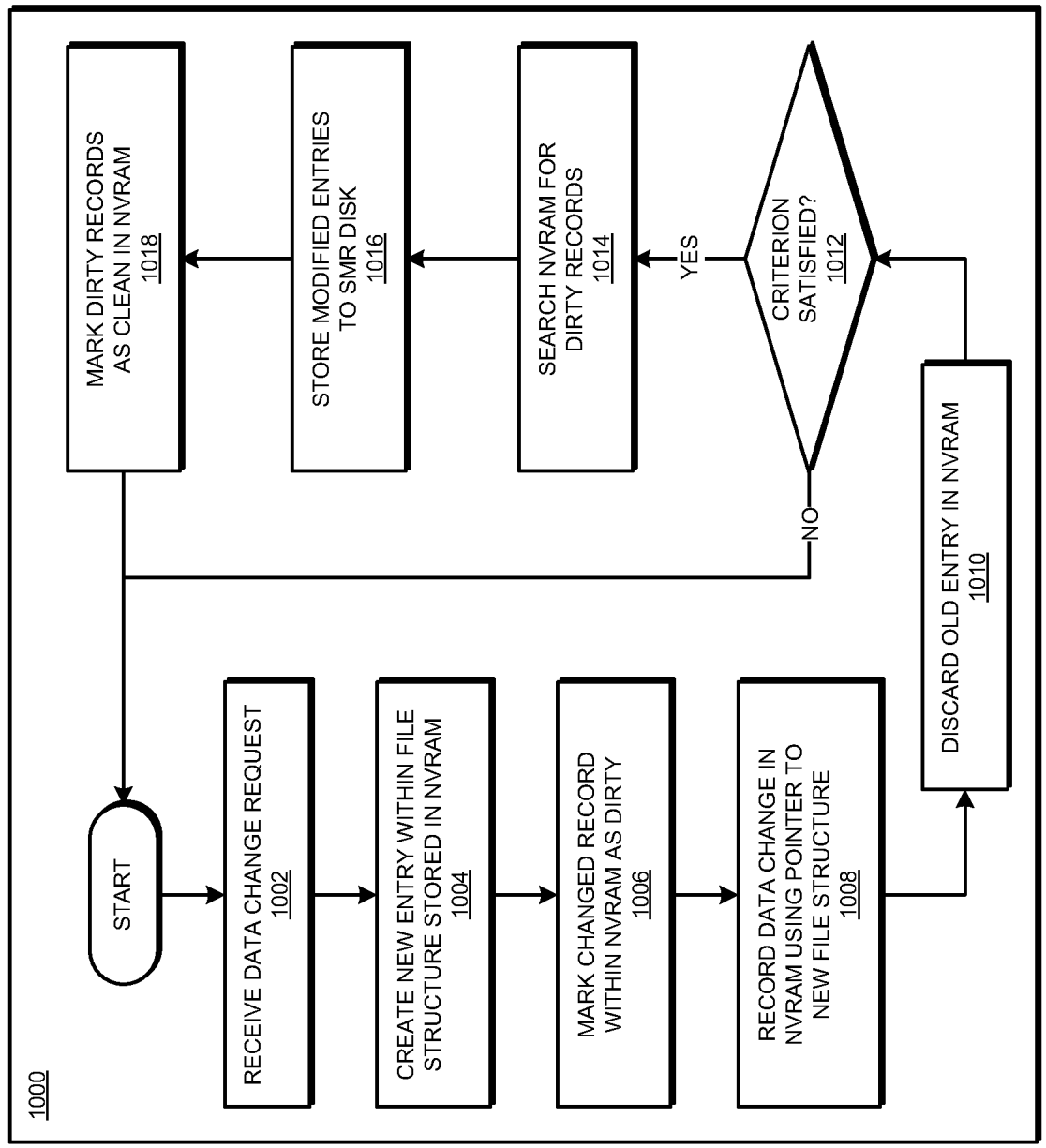
FIG. 10 depicts a flowchart of an example process for maintaining file system data structures for the SMR disk drive in accordance with another illustrative embodiment.

With reference to FIG. 10, this figure depicts a flowchart of an example process 1000 for maintaining file system data structures for SMR disk drive 109 in accordance with another illustrative embodiment. In one or more embodiments, process 1000 can be implemented in application 314 in FIG. 3. In 1002, application 314 receives a data change request for file structure 900 stored on SMR disk drive 109. In 1004, application 314 creates a new entry within a file structure stored in NVRAM 312 corresponding to the data change. In 1006, application 314 marks changed records within NVRAM 312 as "dirty", meaning the particular changed record has not yet been written to SMR disk drive 109. In 1008, application 314 records the data change in NVRAM 312 using a pointer to the new file structure. In 1010, application 314 discards the old entry in NVRAM 312.

In 1012, application 314 determines whether a predetermined criterion is satisfied, such as when disk inactivity is detected, a predetermined number of changes have been performed, or other suitable criterion. If the criterion is not satisfied the process 1000 returns to 1002. If the criterion is satisfied the process 1000 proceeds to 1014. In 1014, a background process of application 314 searches NVRAM 312 for all of the dirty records in NVRAM 312. In 1016, application 314 stores the modified entries of NVRAM 312 to SMR disk drive 109. In 1018, application 314 marks the dirty records in NVRAM 312 as clean and process 1000 returns to 1002.

Figure 11A:
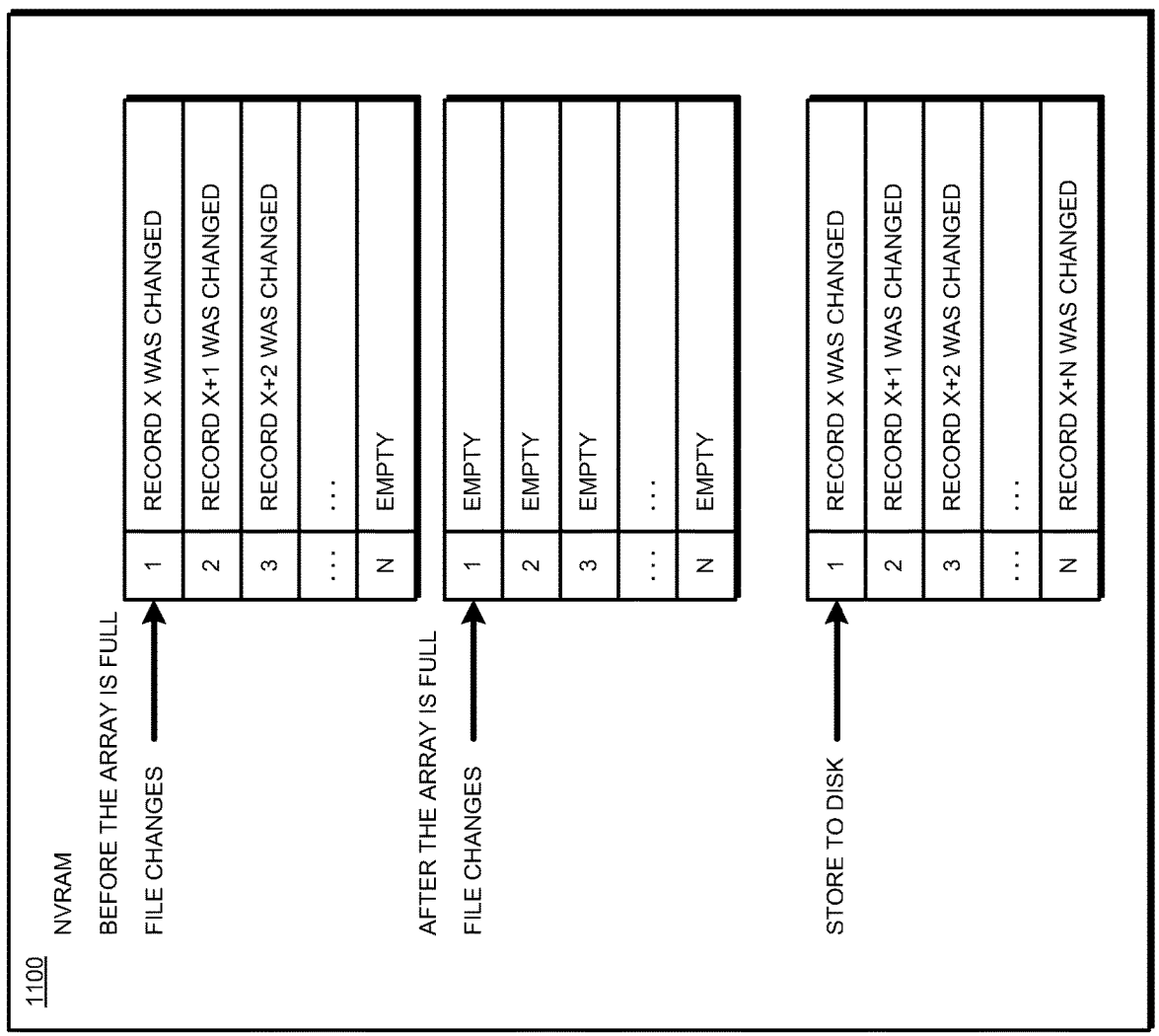
FIGS. 11A-11B depicts another embodiment of a file system data structure stored within the NVRAM for tracking file changes to be stored on the SMR disk drive.

With reference to FIG. 11A, this figure depicts another embodiment of a file system data structure 1100 stored within NVRAM 312 by application 314 for tracking file changes to be stored on SMR disk drive 109. The embodiment includes a variation of the embodiments described in FIGS. 9A-10 above. File system data structure 1100 includes a fixed sized array stored within NVRAM 312 for referencing dirty records. Application 314 allocates a new empty array to keep tracking further changes in memory. Once the array is full, application 314 uses a background process to store the entries of the old array in SMR disk drive 109.

In the particular example of FIG. 11A, the status of the array is shown before the array is full, after the array is full, and storage of the array to SMR disk drive 109. In the example of FIG. 11A, before the array is full, the array contains an indication of a change in record X, record X+1, and X+2. After the array is full, application 314 provides an empty array to keep tracking changes and gives the old (full) array to a background process to store the old array to SMR disk drive 109.

Figure 11B:
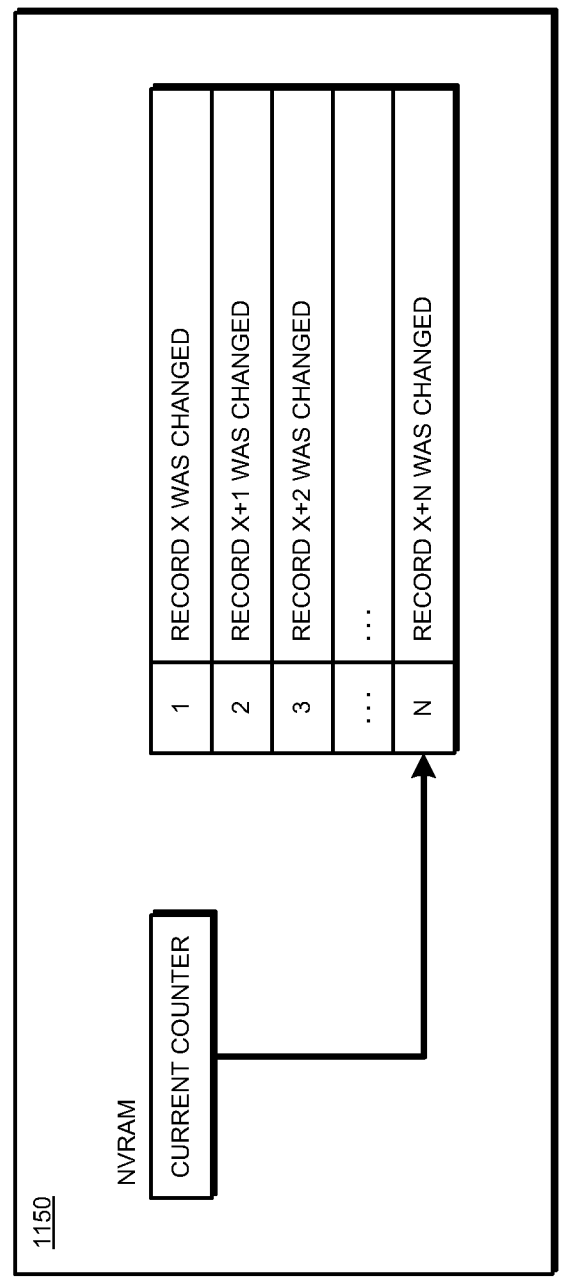

FIG. 11B illustrates a counter 1150 for tracking a next changed entry associated with file system data structure 1100 in which a current counter N is currently set at a record N.

Figure 12:
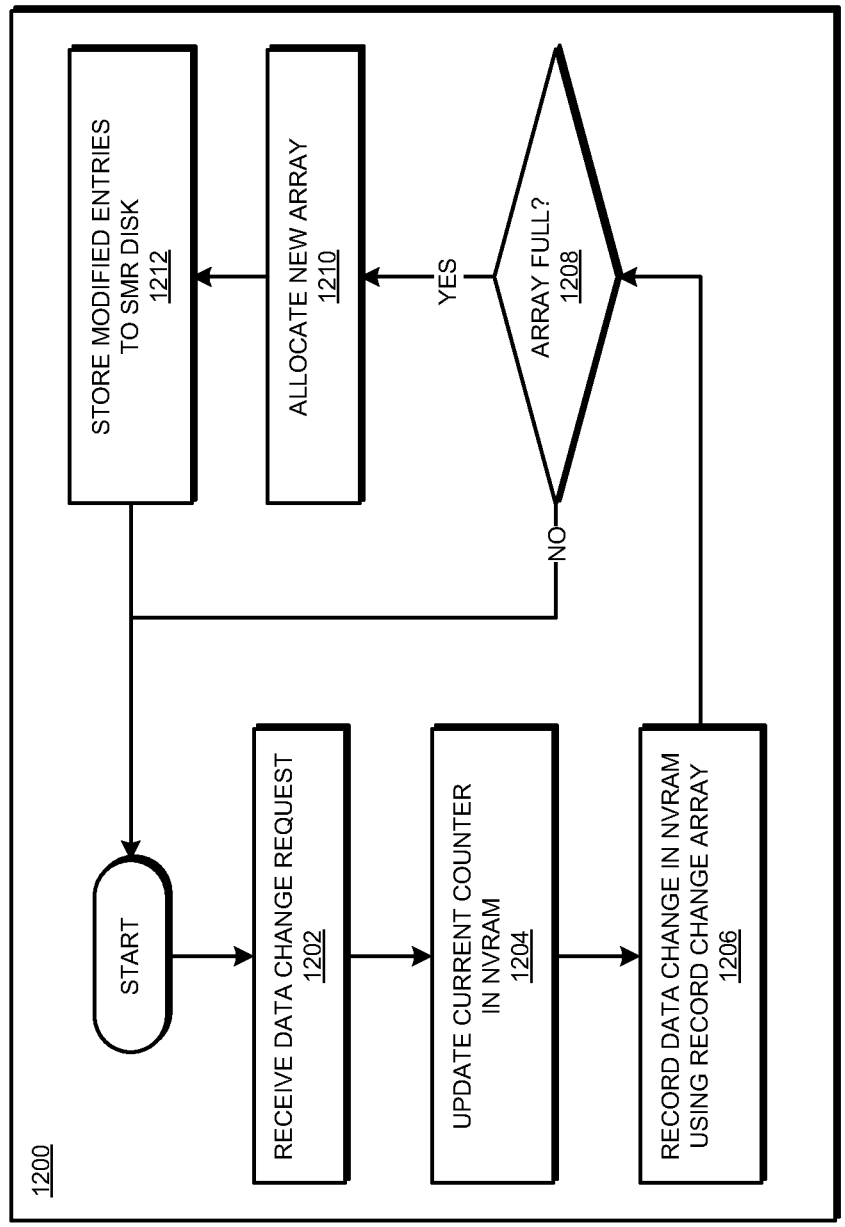
FIG. 12 depicts a flowchart of an example process for maintaining file system data structures for the SMR disk drive in accordance with another illustrative embodiment.

With reference to FIG. 12, this figure depicts a flowchart of an example process 1200 for maintaining file system data structures for SMR disk drive 109 in accordance with another illustrative embodiment. In one or more embodiments, process 1200 can be implemented in application 314 in FIG. 3. In 1202, application 314 receives a data change request for file structure 1000 stored on SMR disk drive 109. In 1204, application 314 updates a current counter in NVRAM 312 for the current record to be changed. In 1206, application 314 records a data change within an entry of a record change array stored in NVRAM 312 corresponding to the data change.

In 1208, application 314 determines whether the array stored within NVRAM 312 is full. If the array is determined to not be full, process 1200 returns to 1202. If the array is determined to be full, process 1200 proceeds to 1210. In 1210, application 314 allocates a new array in NVRAM 312 to keep recording data changes for subsequent data change requests. In 1212, application 314 stores the modified entries of NVRAM 312 in the old array to SMR disk drive 109. The process 1200 then returns to 1202.

Thus, a computer implemented method, system or apparatus, and computer program product are provided in the illustrative embodiments to enable automatic upgrade of a user from one step authentication to two step authentication and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer usable program product comprising one or more computer-readable storage devices, and program instructions stored on at least one of the one or more storage devices, the stored program instructions comprising:
    program instructions to log a data change to data stored on a shingled magnetic recording (SMR) drive as a new entry at an end of a log structure stored in a non-volatile random access memory (NVRAM), wherein the log structure comprises a fixed size array, wherein a location of the new entry within the log structure is determined using a counter stored in the NVRAM;
    program instructions to mark the new entry within the NVRAM as modified; and
    program instructions responsive to a predetermined criterion being satisfied, comprising:
        program instructions to search the NVRAM for log entries marked as modified; and
        program instructions to store the modified log entries to the SMR drive.

2. The computer usable program product of claim 1, wherein the data stored on the SMR comprises data of a file system data structure, further comprising:
    program instructions to maintain a copy of the file system data structure in a random access memory (RAM); and
    program instructions to make the requested data change to the RAM responsive to the logging of the data change in the log entry of the log structure.

3. The computer usable program product of claim 1, further comprising:
    program instructions to set a data consistency flag associated with the new entry to a first value responsive to logging the data change in the log entry of the log structure.

4. The computer usable program product of claim 3, further comprising:
    program instructions to set the data consistency flag associated with the entry to a second value responsive to the receiving of the data change request.

5. The computer usable program product of claim 1, further comprising:
    program instructions to store a first checkpoint mark on the SMR drive responsive to the storing of the modified entries to the SMR drive.

6. The computer usable program product of claim 5, further comprising:
    program instructions to clean the log structure within the NVRAM responsive to the storing of the checkpoint mark on the SMR drive.

7. The computer usable program product of claim 6, further comprising:
    program instruction to store a second checkpoint mark in the NVRAM.

8. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
    program instructions to log a data change to data stored on a shingled magnetic recording (SMR) drive as a new entry at an end of a log structure stored in a non-volatile random access memory (NVRAM), wherein the log structure comprises a fixed size array, wherein a location of the new entry within the log structure is determined using a counter stored in the NVRAM;
    program instructions to mark the new entry within the NVRAM as modified; and
    program instructions responsive to a predetermined criterion being satisfied, comprising:
        program instructions to search the NVRAM for log entries marked as modified; and
        program instructions to store the modified log entries to the SMR drive.

9. The computer system of claim 8, wherein the data stored on the SMR comprises data of a file system data structure, further comprising:
    program instructions to maintain a copy of the file system data structure in a random access memory (RAM); and
    program instructions to make the requested data change to the RAM responsive to the logging of the data change in the log entry of the log structure.

10. The computer system of claim 8, further comprising:
    program instructions to set a data consistency flag associated with the new entry to a first value responsive to logging the data change in the log entry of the log structure.

11. The computer system of claim 10, further comprising:
    program instructions to set the data consistency flag associated with the entry to a second value responsive to the receiving of the data change request.

12. The computer system of claim 8, further comprising:
    program instructions to store a first checkpoint mark on the SMR drive responsive to the storing of the modified entries to the SMR drive.

13. The computer system of claim 12, further comprising:
    program instructions to clean the log structure within the NVRAM responsive to the storing of the checkpoint mark on the SMR drive.

14. The computer system of claim 13, further comprising:
    program instruction to store a second checkpoint mark in the NVRAM.

15. A computer-implemented method, comprising:
    logging a data change to data stored on a shingled magnetic recording (SMR) drive as a new entry at an end of a log structure stored in a non-volatile random access memory (NVRAM), wherein the log structure comprises a fixed size array, wherein a location of the new entry within the log structure is determined using a counter stored in the NVRAM;
    marking the new entry within the NVRAM as modified; and
    performing operations, responsive to a predetermined criterion being satisfied, comprising:
        searching the NVRAM for log entries marked as modified; and
        storing the modified log entries to the SMR drive.

16. The computer-implemented method of claim 15, wherein the data stored on the SMR comprises data of a file system data structure, further comprising:
    maintaining a copy of the file system data structure in a random access memory (RAM); and making the requested data change to the RAM responsive to the logging of the data change in the log entry of the log structure.

17. The computer-implemented method of claim 15, further comprising:
setting a data consistency flag associated with the new entry to a first value responsive to logging the data change in the log entry of the log structure.

18. The computer-implemented method of claim 17, further comprising:
setting the data consistency flag associated with the entry to a second value responsive to the receiving of the data change request.

* * * * *